US008103960B2

(12) United States Patent
Hua et al.

(10) Patent No.: US 8,103,960 B2
(45) Date of Patent: *Jan. 24, 2012

(54) SYSTEM AND METHOD FOR PREVENTING SCREEN-SCRAPERS FROM EXTRACTING USER SCREEN NAMES

(75) Inventors: Morgan Hua, Sunnyvale, CA (US); Jai Rawat, Sunnyvale, CA (US)

(73) Assignee: AOL Inc., Dulles, VA (US)

( * ) Notice: Subject to any disclaimer, the term of this patent is extended or adjusted under 35 U.S.C. 154(b) by 597 days.

This patent is subject to a terminal disclaimer.

(21) Appl. No.: 12/238,864

(22) Filed: Sep. 26, 2008

(65) Prior Publication Data

US 2009/0077476 A1    Mar. 19, 2009

Related U.S. Application Data

(63) Continuation of application No. 10/636,461, filed on Mar. 5, 2004, now Pat. No. 7,430,720.

(51) Int. Cl.
*G06F 3/00*    (2006.01)
(52) U.S. Cl. ........................ 715/758; 715/753
(58) Field of Classification Search .......... 715/753, 715/758
See application file for complete search history.

(56) References Cited

U.S. PATENT DOCUMENTS

| | | | |
|---|---|---|---|
| 5,760,788 A * | 6/1998 | Chainini et al. | 345/474 |
| 5,793,365 A | 8/1998 | Tang et al. | |
| 5,991,438 A * | 11/1999 | Shaked et al. | 382/162 |
| 6,052,709 A | 4/2000 | Paul | |
| 6,167,426 A | 12/2000 | Payne et al. | |
| 6,324,569 B1 | 11/2001 | Ogilvie et al. | |
| 6,336,133 B1 | 1/2002 | Morris et al. | |
| 6,366,950 B1 | 4/2002 | Scheussler et al. | |
| 6,430,602 B1 | 8/2002 | Kay et al. | |
| 6,480,885 B1 | 11/2002 | Olivier | |
| 6,487,586 B2 | 11/2002 | Ogilvie et al. | |
| 6,539,421 B1 | 3/2003 | Appelman et al. | |
| 6,721,410 B1 | 4/2004 | Will | |
| 6,732,146 B1 | 5/2004 | Miyake | |
| 6,779,178 B1 | 8/2004 | Lloyd et al. | |
| 6,781,608 B1 | 8/2004 | Crawford | |
| 6,910,186 B2 * | 6/2005 | Kim | 715/706 |
| 6,990,452 B1 | 1/2006 | Ostermann et al. | |
| 7,007,235 B1 | 2/2006 | Hussein et al. | |
| 2001/0020956 A1 | 9/2001 | Moir | |

(Continued)

FOREIGN PATENT DOCUMENTS

JP    2001350706 A    12/2001

OTHER PUBLICATIONS

C. Prehofer, *Graphical Composition of Components With Feature Interactions*; published 2002; DoCoMo Euro Labs, Munich, Germany.

(Continued)

*Primary Examiner* — William Bashore
*Assistant Examiner* — Gregory A Distefano
(74) *Attorney, Agent, or Firm* — Michael A. Glenn; Glenn Patent Group

(57) ABSTRACT

Graphic screen names are used instead of using text screen names in a Web chat room or an instant messaging system so that screen scrapers cannot generate an e-mail list for spam by extracting the screen names from the Web chat room or instant messaging system.

14 Claims, 5 Drawing Sheets

U.S. PATENT DOCUMENTS

| | | | |
|---|---|---|---|
| 2004/0041818 | A1 | 3/2004 | White et al. |
| 2004/0148346 | A1 | 7/2004 | Weaver et al. |
| 2004/0179039 | A1 | 9/2004 | Blattner et al. |
| 2005/0004993 | A1 | 1/2005 | Miller et al. |
| 2005/0030937 | A1 | 2/2005 | Wick et al. |
| 2006/0041848 | A1 | 2/2006 | Lira |

OTHER PUBLICATIONS

Grau; *A Knowledge Based Scene Analysis System for the Generation of 3-D Models*; Jun. 19-21, 1996; 5$^{th}$ Int. Conf. On Intelligent Systems.

Sahami, et al., *A Bayesian Approach to Filtering Junk E-Mail*; Stanford University, Computer Science Department andMicrosoft Research.

Seligman, et al.; *XML's Impact on Databases and Data Sharing*; Jun. 2001; IEEE.

Archive of www.cooltext.com, published Feb. 16, 2003, retrieved on Apr. 13, 2007; p. i, ii, 1-3; retrieved from website: http://web.archive.org/web/20030220033656/http://www.cooltext.com/.

"MySpace", Wikipedia.com, the free encyclopedia; discusses the history of MySpace.com, as well as its ability to diplay an image set by the user automatically with every comment they leave. Published Feb. 11, 2005, retrieved on Apr. 16, 2008 from website: http://web.archive.org/web/20050211100023/http://en.wikipedia.org/wiki/Myspace.

Ahn, et al.; "Telling Humans and Computers Apart Automatically", Feb. 2004; ACM, vol. 47, No. 2, pp. 57-60.

Ahn, et al.; "CAPTCHA: Using Hard Al Problems for Security"; May 6, 2003, Eurocrypt, Warsaw.

"MySpace", Wikipedia.com, the free encyclopedia; discusses the history of MySpace.com, as well as its ability to diplay an image set by the user automatically with every comment they leave, retrieved on Apr. 16, 2007 from website: http://en.wikipedia.org/wiki/Myspace.

\* cited by examiner

- Prior Art -

- Prior Art -

SYSTEM AND METHOD FOR PREVENTING SCREEN-SCRAPERS FROM EXTRACTING USER SCREEN NAMES

CROSS REFERENCE TO RELATED APPLICATIONS

This application is a continuation of U.S. patent application Ser. No. 10/636,461 filed 5 Mar. 2004 now U.S. Pat. No. 7,430,720.

BACKGROUND OF THE INVENTION

1. Field of the Invention

This invention generally relates to Internet anti-spam technology. More particularly, the invention relates to a system and method for preventing an automated process from extracting users' screen names or e-mail addresses from a chat room or an instant messaging service where a communication screen is viewed by a plurality of users.

2. Description of the Prior Art

Spam usually refers to unsolicited e-mail documents consisting of advertising materials for the lease, sale, rental, gift offer or other disposition of any realty, goods, services or extension of credit when the documents (a) are addressed to recipients who do not have existing business or personal relationships with the initiator, and (b) were not sent at the request of or with the consent of the recipient. An unsolicited e-mail is not necessarily a spam, but all spam is unsolicited.

Spam has become ubiquitous. It is estimated that thirty six percent of all e-mails sent on a given day consists of unsolicited e-mails, otherwise known as "spam". Most people see spam as the scourge of e-mail. On the low end, spam is simply annoying. On the high side, spam is expensive to eliminate and those costs are usually passed on to the consumers. Hence more and more people look for ways to stop it from infecting their e-mail boxes. However, until strong anti-spam laws are passed and actually enforced, spam proliferation would continue because it is a very effective way to reach a mass audience at one time at little or no cost to the sender.

Spam proliferation is harmful to both Internet service providers (ISPs) and consumers. ISPs incur significant business-related costs accommodating bulk mail advertising and answering consumer complaints. Recipients of spam expend resources to sort, read and discard unwanted junk e-mails. If an employee undertakes this exercise at work, the employer also suffers the financial consequences of the wasted time. It is estimated that five man-weeks are wasted for each million recipients who spend just one second to delete an unsolicited e-mail.

In addition to wasting recipients' time with unwanted e-mail, spam also eats up a lot of network bandwidth. Consequently, many organizations and individuals have taken it upon themselves to fight spam with a variety of techniques. Because the Internet is public, there is really little that can be done to prevent spam, just as it is not easy to prevent regular junk mail. However, some online services have instituted policies to prevent spammers from spamming their subscribers.

Spammers need e-mail addresses as much as possible. E-mail collectors collect e-mail addresses and sell their list to spammers who look for e-mail addresses. There are many ways to collect e-mail addresses. The primitive way is to collect manually from advertisements, newspapers, business-cards, or other resources available to the public. Many offline stores even ask their customers to provide their e-mail addresses in exchange for discounts or free merchandise.

Various automated methods for collecting e-mail addresses have been developed. In one of these methods, a program is run to troll the Internet looking for e-mail addresses, much like throwing a net in the ocean and seeing what gets caught in it. Another method is to use a program to screen-scrape a chat room or instant messaging service where a communication screen is viewed by many users. This is possible because users' screen names are displayed as text in the chat rooms or instant messaging services. Screen scrapers can use an automated process to scrape the communication screens every few minutes to get valid screen names in order to send spam to the holders of the screen names.

To block an automated process, one solution is to disable a program's recognition function by getting a living person involved in the process. For example, a program can recognize and process text information easily, but it is usually unable to recognize and process a message which is included in a graphic in a purposefully confusing manner unless a very powerful graphic recognition function is incorporated.

Image based human-recognition steps have been used in e-mail account registration processes. For every living person who has ever taken an online poll or signed up for free web-based e-mail, there are legions of computer-automated Internet robots trying to do the same thing. The automatically produced e-mail accounts are hard to block or trace, making them ideal vehicles for sending spam to legitimate e-mail users. Researchers at Carnegie Mellon University in Pittsburgh have created a security system, known as Gimpy, to thwart the automated process that relentlessly scour cyberspace for opportunities to register new e-mail addresses, stuff ballots for online polls and direct unwitting participants in Internet chat rooms to advertisement.

Gimpy is based on the human ability to read extremely distorted, squiggly, fuzzy or otherwise corrupted text, and the inability of current computer programs to do the same. Gimpy works by choosing a certain number of words from a dictionary, and then displaying them corrupted and distorted in an image. After that, Gimpy asks the user to type the words displayed in the image. While human users have no problem typing the words displayed, current computer programs, such as those based upon optical character recognition (OCR) technology, would be easily flustered if the text were not clear and free of background clutter.

Both Yahoo and MSN have implemented the Gimpy graphic recognition step in their new e-mail account registration process to prevent automated registration. Being usually at the very end of the registration process, the graphic recognition step requires the applicant to type a pass contained in an image into a form field. The pass is typically a randomly given word or combination of characters. FIG. 1 shows a part of MSN's registration screen which requires "Type the characters that you see in the picture". The characters are included in the image 101 in a distorted way to confuse graphic recognition application. If the entered text information 102 matches the correct text information of the pass, then the registration process continues; otherwise, the applicant is prompted to type it again. To enter the correct text information of the pass, the applicant must read and recognize the text information from the given image 101. Typing the pass from the image helps ensure that a person—not an automated program—is completing the registration form. This is important because attackers use harmful programs to try to register large numbers of accounts with Web services such as Yahoo and MSN. Attackers can use these accounts to cause problems for other users, such as sending junk e-mail messages or slowing down the service by repeatedly signing into multiple accounts simultaneously. In most cases, an automated registration program is unable to recognize the characters in the image. Without a living person's involvement, the registration process cannot be completed.

The purpose of this invention is to use a human's natural visual recognition and provide a solution to disable all automated screen scraping processes without having to get a living person's involvement.

SUMMARY OF THE INVENTION

In the preferred embodiment of the invention, an Internet based messaging system includes a plurality of logged-in users communicating with each other by displaying messages on a communication screen from which any of the logged-in users' screen identification and the displayed messages can be read by all users. The messaging system includes a mechanism for automatically converting a user's screen name into a graphic from which an ordinary person can recognize the user's screen name. The graphic is displayed on the communication screen whenever and wherever the user's screen name is displayed.

DETAILED DESCRIPTION OF THE INVENTION

This invention provides a system and method for displaying graphical screen names (i.e. screen identifications) to prevent an automated process from scraping the displayed text information in an instant messaging service such as a chat room. The system first takes each logged-in user's text screen name and then uses the screen name to generate a graphic that can only be read by a human but cannot be screen-scraped by an automated process. The system also enables a user to add background wallpaper or other personal expression elements to the graphic.

Figure 1:
FIG. 1 is a partial screen of MSN's e-mail registration process illustrating a step requesting the applicant type the characters contained in a given image to prevent automated registration.
Figure 2:
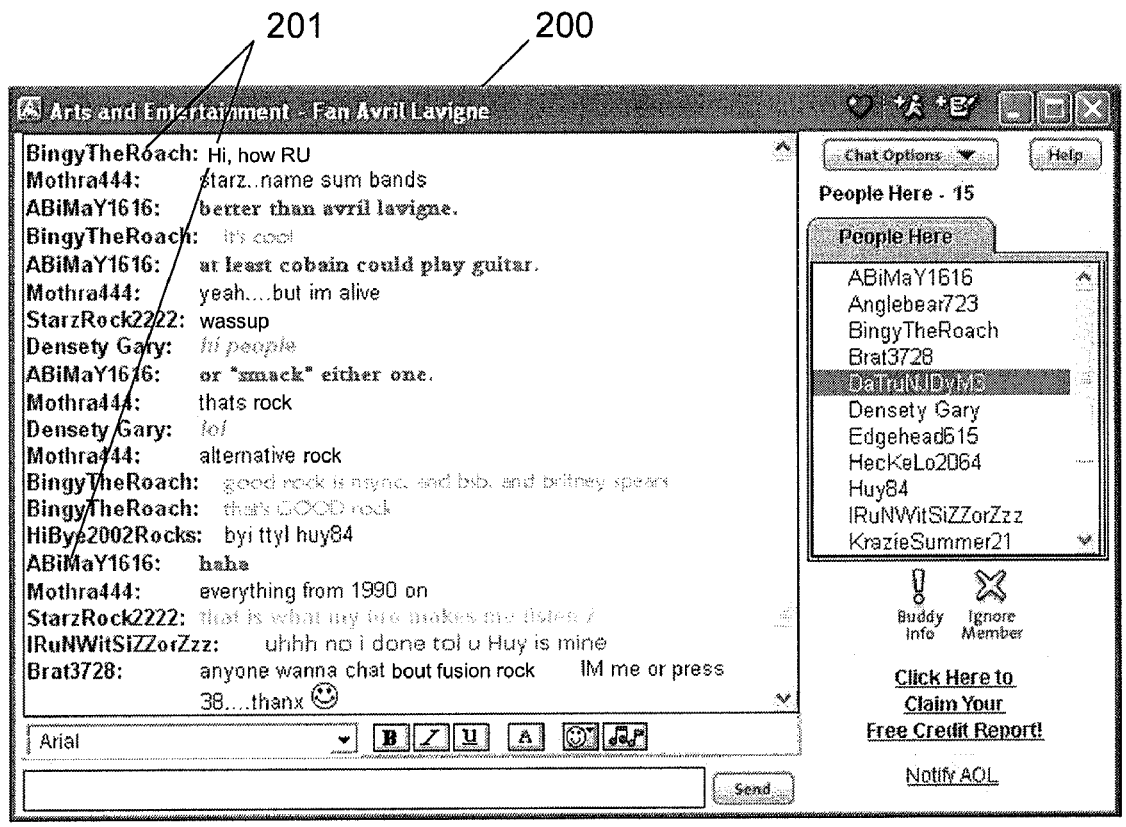
FIG. 2 is an exemplary chat room screen where the participants' screen names are displayed in text according to the current art.

FIG. 2 is an exemplary chat room screen 200 according to the current state of art where the logged-in users' screen names 201 are displayed as text. A user may choose the font, size, and other editing features for his screen name. For a screen scraper to get the logged-in users' e-mail addresses, it is not difficult to copy all textual information displayed in the message window and suffix "@aol.com" to each word or phrase ending with ":".

In the preferred embodiment of the invention, an Internet based messaging system includes a plurality of logged-in users communicating to each other by displaying their messages on a communication screen from which any of the users' screen name and the displayed messages can be read by all users. To accomplish the purpose of this invention, the messaging system includes at least a sub-system for automatically converting a user's screen name into a graphic from which an ordinary person can recognize the user's screen name. The graphic is displayed on the communication screen whenever and wherever the user's screen name is to be displayed.

This invention focuses on displaying screen names using graphics to prevent automated screen scrapers from working. There is no interactive part to the invention. A user may choose a style for his graphic screen name from a variety of predefined formats. The user may even customize his graphic screen name format by setting background image, font of characters for screen names, and font size. In addition, the user may choose to disable the automatic conversion function if he likes.

Figure 3:
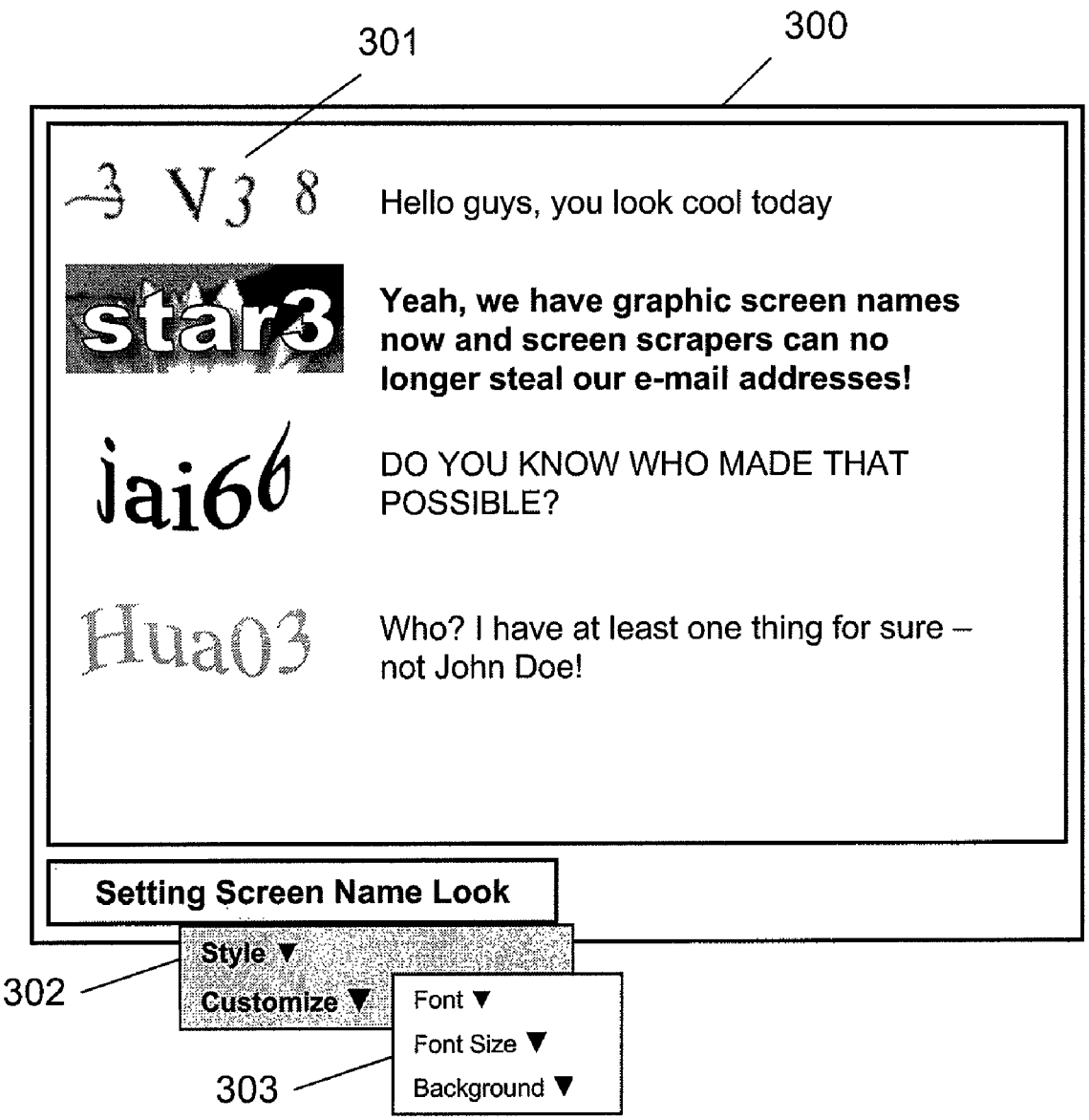
FIG. 3 is an exemplary chat room screen where the participants' screen names are displayed in stylized images to stop an automated process from extracting screen names from the displayed information according to the invention.

FIG. 3 is an exemplary chat room screen 300 where each user's screen name, such as 301, are displayed by a graphic. The overall graphic appearance can be selected from a drop down menu 302, from which the user can choose a style for the image from a variety of predefined formats. The user may further customize the style by setting various parameters such as style, font, background and other customizable features from the menu 303.

The graphic is a set of data representing a two-dimensional scene, that is composed of pixels arranged in a rectangular array with a certain height and width. Each pixel may consist of one or more bits of information, representing the brightness of the image at that point and including color information encoded as RGB triples.

Figure 4:
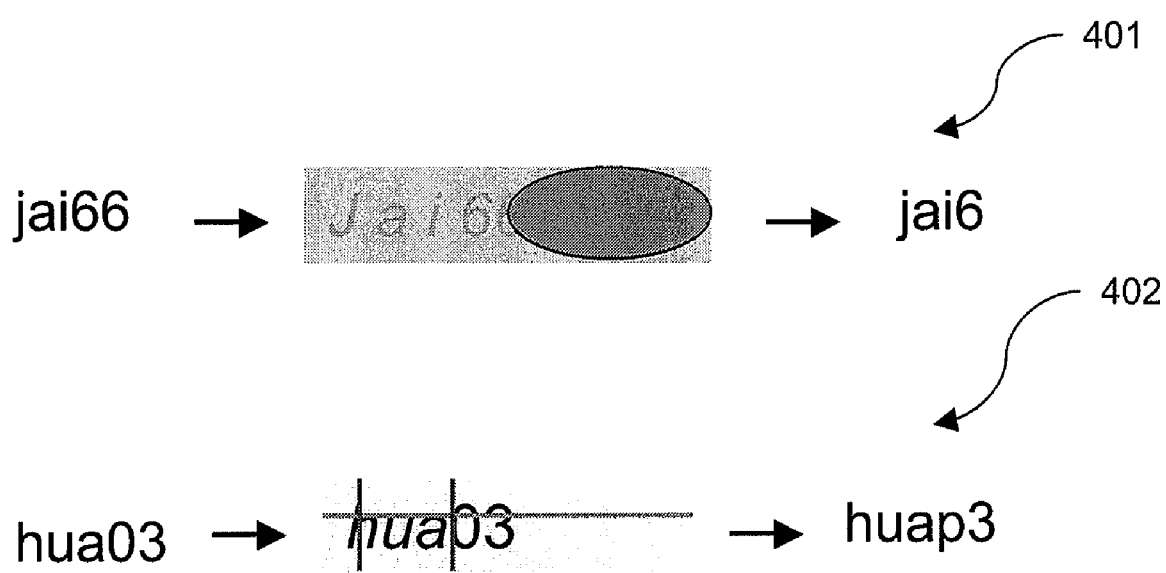
FIG. 4 is a schematic diagram illustrating two exemplary situations wherein a participant's screen name in a customized image appears different from the participant's real screen name.

Because an ordinary human reader should be able to recognize a user's graphic screen name without confusion, a mechanism, e.g. a graphics recognition system, may be added to the preferred embodiment to avoid ordinarily confusing visual situations. FIG. 4 is a schematic diagram illustrating two exemplary situations wherein a participant's screen name in a customized image appears different from the participant's real screen name. In the first situation 401, the last character of the screen name "JAI66" is merged into a red background and thus the screen name looks like "JAI6". In the second situation 402, because of the background line, the user name "hua03" looks like "huap3".

Figure 5:
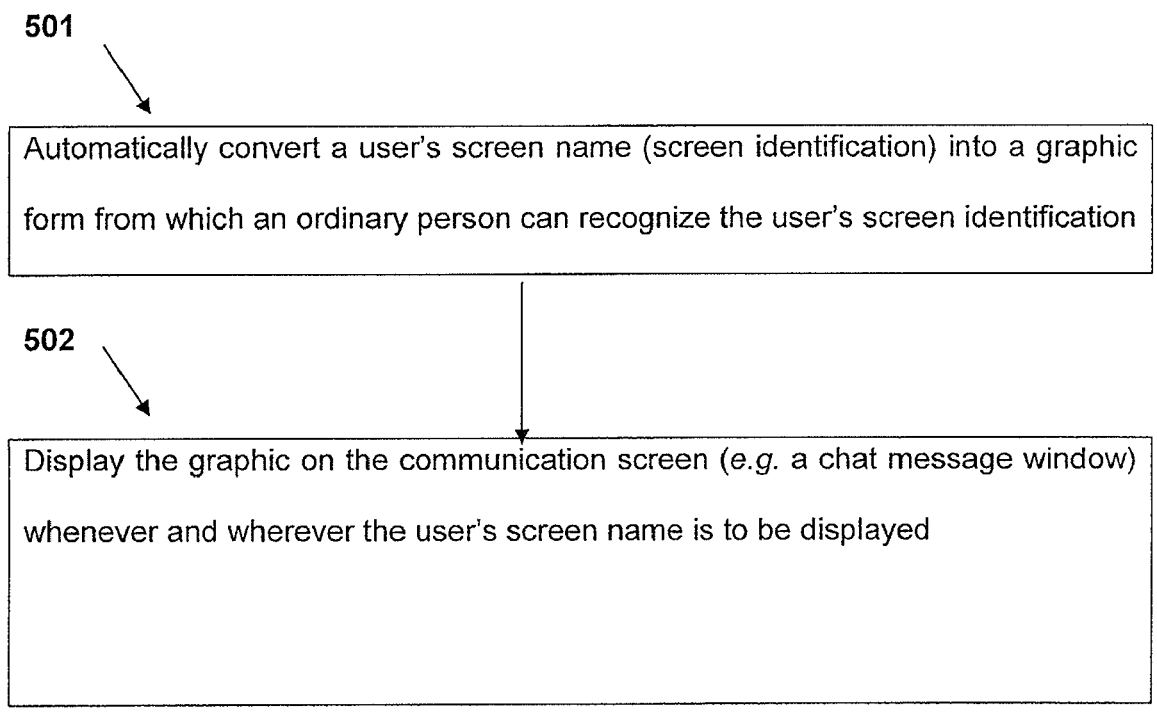
FIG. 5 is a flow diagram illustrating an automated process from extracting users' screen names from a communication screen wherein a number of users logged in an Internet based network communicate to each other by displaying messages according to the invention.

FIG. 5 is a flow diagram illustrating an automated process for extracting users' screen names from a communication screen wherein a number of users logged into an Internet based network communicate with each other by displaying messages. The method includes the steps of:

Step 501: Automatically converting a user's screen name (screen identification) into a graphic form from which an ordinary person can recognize the user's screen identification; and Step 502: Displaying the graphic on the communication screen (e.g. a chat message window) whenever and wherever the user's screen name is to be displayed.

The solution described above can be used for any chat room or messaging system such as AOL's AIM window and Message Boards where the users do not want an automated process to discover what their screen names are.

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

The invention claimed is:

1. An apparatus for preventing screen scrapers from extracting user screen names, comprising:
an Internet based real-time, text-based instant messaging system
in which a plurality of logged-in users communicate with each other by displaying real-time, text-based instant messages on a communication screen from which any of the logged-in users' screen identification and the displayed messages can be read by other users; and
said real-time, text-based instant messaging system further comprising a mechanism for automatically converting a user's screen name into a graphic from which an ordinary person can recognize the user's screen name without user intervention;
wherein the graphic is displayed on the communication screen instead of a text form of said user's screen name whenever and wherever the user's screen name is displayed in order to prevent screen scrapers from extracting user screen names.

2. A method for displaying graphical screen names to prevent an automated process from scraping the displayed text information in a real-time, text-based instant messaging service, comprising the steps of:
preventing screen scrapers the ability to extract the screen name of one or more users of a real-time, text-based instant messaging application by configuring a computer processor for performing the steps of:
taking each logged-in user's text screen name; and
using said screen name to automatically, and without user intervention, generate a graphic that can only be read by a human but cannot be screen-scraped by an automated process; and
only displaying, on a display, said graphic corresponding to said user in said real-time, text-based instant messaging application instead using a text form of said user's screen name.

3. The method of claim 2, further comprising the computer processor performing the step of:
enabling a user to add background wallpaper or other personal expression elements to the graphic.

4. The method of claim 2, further comprising the computer processor performing the step of:
selecting overall graphic appearance from a drop down menu to choose a style for said graphic from a variety of predefined formats.

5. The method of claim 4, further comprising the computer processor performing the step of:
customizing said graphic style by setting parameters which comprise any of style, font, background, and other customizable features from the drop down menu.

6. The method of claim 2,
wherein said graphic comprises a set of data representing a two-dimensional scene, that is composed of pixels arranged in a rectangular array with a certain height and width;
wherein each pixel may consist of one or more bits of information, representing brightness of the graphic at that point and including color information encoded as RGB triples.

7. The method of claim 2, further comprising the computer processor performing the step of:
providing a graphics recognition system to avoid ordinarily confusing visual situations.

8. A method for preventing screen scrappers from extracting user screen names, in a real-time, text-based, Internet based instant messaging application comprising the steps of:
providing a network in which a plurality of logged-in users communicate with each other by displaying real-time, text-based instant messages on a communication screen from which any of the logged-in users' screen identification and the displayed messages can be read by other users;
providing within said real-time, text-based instant messaging system a mechanism for automatically converting a user's screen name into a graphic from which an ordinary person can recognize the user's screen name, without user intervention; and
displaying, on a display, only the graphic on the communication screen instead of a text form of said user's screen name whenever and wherever the user's screen name is displayed, thereby preventing screen scrapers from extracting user screen names.

9. An apparatus for displaying graphical screen names to prevent an automated process from scraping the displayed text information in a real-time, text-based instant messaging service, comprising:
a mechanism for taking each logged-in user's text screen name; and
a mechanism for using said screen name to automatically, and without user intervention, generate a graphic that can only be read by a human but cannot be screen-scraped by an automated process; and
a mechanism for displaying only the graphic on the communication screen instead of a text form of said user's screen name whenever and wherever the user's screen name is displayed, thereby preventing screen scrapers from extracting user screen names.

10. The apparatus of claim 9, further comprising:
a mechanism for a user to add background wallpaper or other personal expression elements to the graphic.

11. The apparatus of claim 9, further comprising:
a drop down menu for selecting overall graphic appearance to choose a style for said graphic from a variety of predefined formats.

12. The apparatus of claim 11, further comprising:
a mechanism for customizing said graphic style by setting parameters which comprise any of style, font, background, and other customizable features from the drop down menu.

13. The apparatus of claim 9,
wherein said graphic comprises a set of data representing a two-dimensional scene, that is composed of pixels arranged in a rectangular array with a certain height and width;
wherein each pixel may consist of one or more bits of information, representing brightness of the graphic at that point and including color information encoded as RGB triples.

14. The apparatus of claim 9, further comprising:
a graphics recognition system for avoiding ordinarily confusing visual situations.

* * * * *